Figure 1:
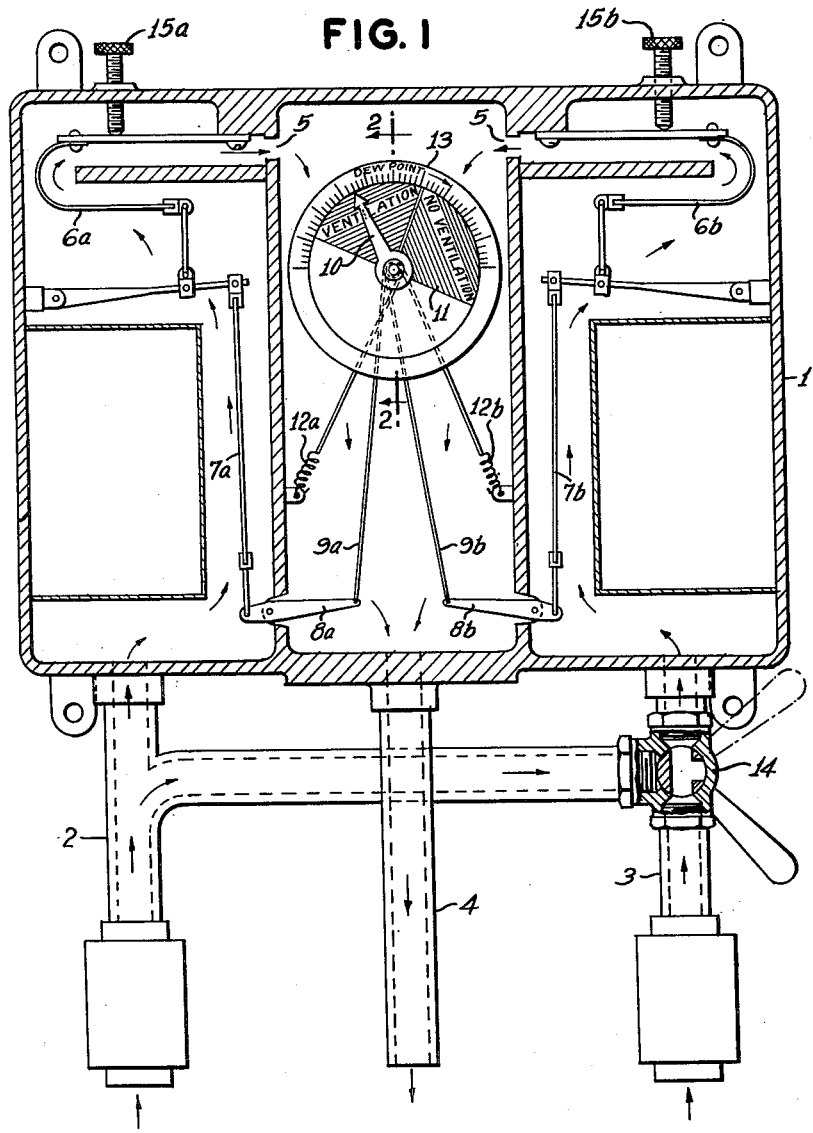

Oct. 31, 1950     F. C. STEWART     2,528,018
HYGROMETRIC INSTRUMENT
Filed March 12, 1949

INVENTOR
*Frederick Charles Stewart*
BY
*Pennie, Edmonds, Morton and Barrows*
ATTORNEYS

UNITED STATES PATENT OFFICE 2,528,018

HYGROMETRIC INSTRUMENT

Frederick Charles Stewart, Govan, Glasgow, Scotland

Application March 12, 1949, Serial No. 81,063
In Great Britain March 16, 1948

1 Claim. (Cl. 73—335)

It is the purpose of this invention to provide a simple instrument which will indicate or relate dew points of atmospheres without the necessity of observing wet and dry bulb temperatures or dry bulb temperatures and humidity and estimating the dew point from charts relating these observations with dew points.

The instrument is primarily intended for facilitating dew point observation when performed for the purpose of controlling apparatus installed in a ship for the prevention of damage to cargo in cargo compartments, as a result of condensation on the cargo, or on the internal surfaces of the ship's structure.

For convenience, in what follows I shall refer to a space to be ventilated as a "cargo space."

It is now well established that on occasions when the internal dew point in a cargo space is above the temperature of the outside atmosphere there is danger of condensation on the ship's structure and of damage to the cargo as a result. Under these conditions it must necessarily follow that the dew point of the atmosphere will be below the dew point of the atmosphere inside the cargo space and that relief from this danger of condensation will be obtained if adequate volumes of fresh air from the outside are passed through the cargo space, since the dew point of the outside atmosphere must necessarily be below that of the dry bulb temperature, and therefore a lower temperature than the dew point inside the cargo space, and that, if the high dew point air of the cargo space is replaced by fresh air from the outside at a dew point lower in temperature than the ship's structure, condensation cannot occur.

In certain circumstances such as in conditions where a cargo is loaded cold and the vessel passes subsequently into warm humid regions where the dew point of the atmosphere is higher than the temperature of the cargo, the delivery of this high dew point atmosphere into the cargo space would result in condensation on the cargo.

It is important, therefore, that ship's officers who are responsible for the maintenance of the ship's cargo in a good condition and for the prevention of damage thereto because of condensation should be in a position readily to assess the relative condition of the atmosphere inside the cargo space and of the outside atmosphere in order that they may be guided as to whether they should ventilate the cargo space with outside air or prevent any ventilation and seal off the cargo space from the outside atmosphere.

Hitherto, it has been the usual practice to make regular observations of the wet and dry bulb temperatures of the cargo space atmosphere and the outside atmosphere, or, alternatively, observations of the dry bulb temperature and the humidity of these atmospheres, and from these readings to estimate by means of hygrometric charts or tables the relative dew points and the relation of the inside dew point to the sea water and atmospheric temperatures, these latter temperatures controlling the temperature of the ship's structure.

It is evident that the greatest freedom from condensation inside the cargo space will exist when said space is filled with air of the lowest dew point which can be secured. In other words, if the dew point of the outside atmosphere exceeds that of the cargo space atmosphere, measures should be taken to prevent the outside atmosphere from entering the cargo space, whereas, if the conditions are reversed, the cargo space atmosphere should be replaced by the outside air of lower dew point by means of fans or otherwise. In either case it may be an advantage still further to reduce the dew point by some form of dehumidifying apparatus.

It follows, therefore, that if the officer in charge is able readily to relate the internal and external dew points, he is guided with regard to the procedure which he should adopt, and the object of this invention is to provide a simple instrument which will indicate directly the procedure to be adopted.

Examination of hygrometric data indicates that in any atmosphere there is a relation between humidity measured as a percentage of complete saturation and the difference between dry bulb temperature and dew point temperature. For example, the difference between dry bulb temperature and dew point temperature in air having a humidity of 80% varies between 6° to 7° over the dry bulb range from 32° to 100°, and similar relations with small variations exist with other humidities.

When these relationships between percentage humidity and temperature difference are plotted, it is possible to approximate them to within certain limits of humidity by a straight line law, such as $$H = 100 - \frac{10}{K}(T-t)$$

where H=humidity expressed as a percentage, T and t dry bulb temperature and dew point temperature, respectively; K being a constant which when equal to 4 makes the equation approximately true between 100% and 40% humidity and dry bulb temperatures between 32° to 100° F. With this approximation it may be assumed that equal increments of temperature difference between dry bulb and dew point temperatures involve equal increments of humidity change over the stated range.

It is well known that materials such as human hair or gold beaters' skin expand and contract with rise and fall of humidity, irrespective of temperature. It is also possible to arrange bi-metal structures or bellows containing volatile spirit which expand and contract with rise and fall of temperature, irrespective of humidity. I combine an element sensitive to humidity with one sensitive to temperature so that the combined length of these elements, when connected in series relation to one another, will be constant for any particular dew point, irrespective of humidity and temperature.

Any change in atmospheric conditions which would increase the dew point will introduce a change in the length of the combined elements and these may, therefore, be used as a medium for dew point measurement when suitably coupled to an indicating pointer and scale.

For the comparison of dew points such as is necessary in the control of ventilation and de-humidification in a ship cargo space, as described above, I provide for association of two pairs of sensitive elements in one measuring instrument, one pair of sensitive elements being in a compartment connected to the cargo space atmosphere and the other pair of sensitive elements being in a separate compartment connected to and under the influence of the outside atmosphere. I further provide that these pairs of elements will operate individual indicators, e. g., a pointer and a dial, preferably mounted for rotary movement on a common axis, the relative positions of these indicators being used to indicate directly the relation of the outside dew point to that inside the cargo space, and the observer adjusting the ventilation or de-humidification equipment according to the procedure established.

Figure 2:
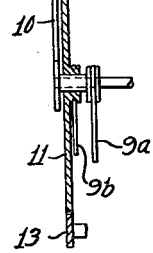

In the drawings, which form a part of this application, Fig. 1 is a vertical sectional view of an instrument constructed according to the invention, and Fig. 2 is a fragmentary vertical sectional view taken on the line 2—2 of Fig. 1.

Referring to the drawing, I denotes a casing divided into three compartments, an outer one of these compartments having a pipe connection 2 to the outside atmosphere, the other outer one having a pipe connection 3 to the cargo space, and the intermediate compartment having a pipe connection 4 to a source of suction such as the inlet of a fan, thereby creating an air flow from the outside atmosphere and from the cargo space, through the two outer compartments, into the intermediate compartment via openings 5 and thence from the instrument.

In each of the outer compartments is arranged a temperature sensitive element at 6$^a$ and 6$^b$ linked respectively to humidity sensitive elements 7$^a$ and 7$^b$, these elements being further linked through levers 8$^a$, 8$^b$ and cords 9$^a$, 9$^b$ to operate; in the case of 9$^a$ the pointer 10, and in the case of 9$^b$ the dial 11; tension elements 12$^a$, 12$^b$ maintaining all the linkages in tension.

The effect of the combination of the temperature sensitive element and the humidity sensitive element is such that the variation in the effective length of said elements and links is a function of the dew point of the air drawn over these elements, the pointer 10 indicating on the scale 13 the dew point of the atmosphere, and a registering line on the dial 11 indicating the dew point of the air from the cargo space.

When the dew point of the cargo space is higher than that of the outside atmosphere, the correct procedure is to use ventilating apparatus to ventilate the cargo space with atmospheric air, whereas, when the pointer registering the dew point of the outside atmosphere is at a higher level on the dew point scale than the indicating line on the dial, thus indicating that the dew point in the cargo space is at a lower temperature than that of the atmosphere in the case, ventilation should be stopped and the cargo space sealed from the outside atmosphere as far as possible. The result of this relation is such that the dial can be divided into two areas, a "ventilation" area and a "no ventilation" area, and the procedure to be adopted by the observer will be indicated by the area wherein the pointer lies.

Provision is made on the instrument for adjustment by a two-way cock 14 so arranged that air of the same quality may be drawn from a common source, in which case the pointer and the indicating line on the dial should be coincident on the scale. Adjusting screws 15$^a$ and 15$^b$ are arranged for bringing the indicators to a common reading under this condition and thereafter by the operation of the two-way valve 14 each temperature and humidity element may be brought again under the influence of the respective atmosphere.

What is claimed is:

A hygrometric instrument for indicating or relating the dew points of the atmosphere and of a space to be ventilated, comprising a casing having two compartments respectively connectible to the atmosphere and to said space, a temperature sensitive element and a humidity sensitive element linked to one another in each of said two compartments, an indicator linked to the elements in one of said compartments, an indicator co-related to said first mentioned indicator and linked to the elements in the other of said compartments, a scale co-operative with said indicators, a third compartment intermediate said two compartments, said third compartment housing the indicators and having communication with said two compartments and being connectible to a source of suction, and a valved device for connecting the three compartments to a common source of air supply.

FREDERICK CHARLES STEWART.

REFERENCES CITED

The following references are of record in the file of this patent:

UNITED STATES PATENTS

| Number | Name | Date |
|---|---|---|
| 2,235,954 | Whitney et al. | Mar. 25, 1941 |
| 2,344,530 | Askew | Mar. 21, 1944 |

FOREIGN PATENTS

| Number | Country | Date |
|---|---|---|
| 257,427 | Germany | Mar. 5, 1913 |
| 546,430 | Germany | Mar. 22, 1932 |
| 563,404 | Germany | Nov. 4, 1932 |